United States Patent [19]
Ailin-Pyzik et al.

[11] 4,347,890
[45] Sep. 7, 1982

[54] METHOD FOR BINDING PARTICULATE MATERIALS

[75] Inventors: Iris B. Ailin-Pyzik, Norristown; James S. Falcone, Jr., Devon, both of Pa.

[73] Assignee: PQ Corporation, Valley Forge, Pa.

[21] Appl. No.: 241,877

[22] Filed: Mar. 9, 1981

[51] Int. Cl.³ ............................................. B28B 7/34
[52] U.S. Cl. ............................... 164/528; 106/38.3; 106/38.9; 106/74; 106/84; 204/157.1 R
[58] Field of Search ............... 106/38.3, 38.35, 38.9, 106/74, 84; 423/332; 164/528

[56] References Cited
U.S. PATENT DOCUMENTS

| | | | |
|---|---|---|---|
| 2,748,435 | 6/1956 | Hackett | 106/38.35 |
| 2,883,723 | 4/1959 | Moore et al. | 106/38.3 |
| 2,895,838 | 7/1959 | Ilenda | 106/38.3 |
| 3,135,029 | 6/1964 | Cooper et al. | 106/38.35 |
| 3,180,746 | 4/1965 | Patton et al. | 106/74 |
| 3,209,420 | 10/1965 | King et al. | 106/38.35 |
| 3,660,297 | 5/1972 | McCammon | 106/74 |
| 4,021,256 | 5/1977 | Oda | 106/74 |

OTHER PUBLICATIONS

Cole et al., "Microwave Cured Sodium Silicate Bonded Cores", *Trans. Amer. Foundrymen's Soc.*, 87, 605-612, 1979.

*Primary Examiner*—Lorenzo B. Hayes
*Attorney, Agent, or Firm*—Ernest G. Posner; J. S. Stephen Bobb; Fred C. Philpitt

[57] ABSTRACT

A method for binding particulate materials which involves mixing the particulate material with a solution containing lithiumions, blending sodium silicate into the mixture and subsequently shaping the mixture to the desired form and curing same by microwave radiation.

9 Claims, No Drawings

METHOD FOR BINDING PARTICULATE MATERIALS

BACKGROUND OF THE INVENTION

This invention relates to an improvement in the use of sodium silicate as a binder for sand molds and cores used in foundries to cast various metals. More particularly the improvement involves a sodium-lithium binder for the sand cured in a microwave oven.

Sodium silicate has long been known as a binder for sand molds and cores used in metal casting. British Pat. No. 15,619 issued in 1898 discloses sodium silicate set with $CO_2$ as a suitable binder for molds and cores. Even though this process has been known and practiced for more than 75 years, it is not completely satisfactory. Uniform administration of $CO_2$ to the silicate-saturated sand is difficult to achieve, resulting in incompletely set molds that must be rejected. Removal of cores from the finished metal castings is also a long-standing problem. In addition to these problems, molds and cores do not maintain the required strength upon storage in humid conditions.

These problems are well recognized, and other means of augmenting sodium silicate binders have been proposed. U.S. Pat. Nos. 2,748,435; 3,135,029 and 3,209,420 disclose binder systems with silicate and thermosetting resins, acrylamide polymers and urea formaldehyde resins, respectively. These patents, among numerous others, attempt to solve not only the shortcomings of the silicate bound systems, but those of the organic binder systems. None of these approaches appears to be universally accepted.

An additional, and more recent, problem with the use of sodium silicate binders is associated with reuse of the sand to make further molds or cases. Reuse of the sand from silicate-bound cores suffers from the silicate gel that surrounds the sand grains. This situation manifests in short setting times which do not allow proper working. This problem, as well as others, was addressed by Cole, Owusu and Nowichi in a publication, "Microwave Cured Sodium Silicate Bonded Cores," *Trans Amer. Foundrymen's Soc.*, 87, 605-612, 1979. In this system less sodium silicate was required to provide the bonding, and therefore the sand could possibly be reused more readily. However, this approach did not provide any relief from the problem of moisture-induced strength loss.

The ideal binder system for foundry molds using a silicate solution should have the following characteristics: the amount of silicate should be low so that sintering is minimized, shakeout after casting is facilitated, and the sand can be reclaimed more readily. The sand-binder mixture should set quickly while providing sufficient green strength so that the piece can be handled. This strength should be persistent so that the mold or core can be stored under ambient conditions. The binder should not release noxious vapors at practical metal-pouring temperatures, and it should be economical.

We have found that a sodium silicate solution combined with lithium ion and the mold sand can be cured in a microwave oven to provide these characteristics. In searching the art area we have not found references to such binders. The closest reference to a silicate binder system containing both sodium and lithium ions appears to be U.S. Pat. No. 3,180,746 to Patton and Cox. This patent discloses a surface bonding agent employed in preparing coatings such as zinc-rich corrosion resistant paints and the like. The process for preparing the so-called lithium-sodium-silicate binder solution involves autoclaving a mixture of silica gel, sodium hydroxide, lithium hydroxide and water. The temperature is raised to 150° C. in a period of 30 to 90 minutes. Cooling from 150° C. to 95° C. must also be accomplished in this 30 to 90 minute period. The temperature must now be controlled so that the temperature declines from 95° C. to 40° C. in 150 to 240 minutes. Cooling to room temperature requires 60 to 120 minutes. Even if this binder were suitable for sand foundry molds, its preparation is too complicated and expensive.

SUMMARY OF THE INVENTION

A sodium silicate modified with lithium ion is found to be a suitable binder for sand foundry molds and cores when cured by microwave heating. Our method of preparing foundry molds and cores involves mixing the sand with a solution containing lithium ions until a uniform damp mixture is obtained; then a sodium silicate solution is mixed in, followed by any other component required, the damp mixture is placed around the pattern or in the core box and the entire unit is then subjected to microwave heating to cure the binder system. While the hot mold or core has sufficient strength to be handled and used, considerably more strength is developed upon cooling. This strength is sustained upon exposure to humid conditions of storage. These results are obtained using about 1 part by weight (pbw) of lithium-sodium-silicate solids per 100 pbw of sand or equivalent particulate mold ingredients. Prior art methods require more than 2.5 pbw of solids per 100 pbw of sand while achieving essentially unacceptable results.

Applicants do not wish to be bound by theory or hypothesis, but they believe that the superior results are achieved by formation of a glassy bond, rather than a geltype bond. The lithium component is believed to confer moisture resistance because glassy lithium containing silicate is less apt to hydrate.

THE INVENTION

The sodium silicate solution can be any that provides sufficient tack to produce initial set strength. Said silicate may be a commercially available solution, or one prepared by dissolving a suitable hydrous powder or a hydrated glass. Sodium silicates that contain about 1.5 to about 2.8 pbw of $SiO_2$ per pbw of $Na_2O$ are satisfactory. We prefer to have about 1.8 to 2.4 pbw of $SiO_2$ per pbw of $Na_2O$. The concentration of such solutions should be 35 to 50% solids.

The source of lithium ions in the system or method of our invention can be any convenient solution that contains lithium ion but does not contain chemical species that induce gelling of the silicate. In general, solutions of any of the lithium salts of the so-called glassy phosphates, borates and silicates are suitable, as well as lithium hydroxide. We prefer lithium silicate and lithium hydroxide.

Water in addition to that supplied by these solutions may also be required. Aqueous dispersions of colloidal silica such as silica sols may also be required to provide additional silica to the formulation.

The performance of our binder depends upon its composition. The mole ratio of $SiO_2/M_2O$ wherein $$M_2O = Li_2O + Na_2O$$

is important to developing green strength. This ratio must be controlled to provide green strength; if it is too high, the binder will not have sufficient tack to provide the required green strength. This $SiO_2/M_2O$ ratio can be about 4, but is usually less than that. We prefer about 1.5 to 3.0 moles of $SiO_2$ per mole of $M_2O$. Another compositional factor that influences the performance is the mole ratio of $Na_2O/Li_2O$. If this ratio is too low the green strength will be unsatisfactory; if it is too high the moisture resistance will be poor. There should be 1.25 to 20.0 moles of $Na_2O$ per mole of $Li_2O$. We prefer 1.5 to 10 moles of $Na_2O$ per mole of $Li_2O$.

The method of our process is carried out as follows. The sand and/or other particulate refractory material is placed in a muller such as a Hobart mixer. The lithium component is dissolved, if necessary, and mixed with the sand for a period of time that is sufficient to assure a uniform mix, but short enough to prevent evaporation of moisture from the mixture. We prefer a mixing time of about 20 to 60 seconds. The sodium silicate is dissolved, if necessary, and added to the mix. The mixing or blending time is controlled for the reasons stated herein. We prefer 60 to 300 seconds of mixing time. After mixing the damp material is placed in the mold or core box and packed to assure good contact with the pattern and to prevent air cavities which reduce the strength of the mold or core. Tamped and consolidated mold or core can be removed from the respective boxes and subjected to microwave heating to be cured and complete the method of our invention. The amount of liquid binder components used is usually about 1.5 to 3.5 pbw of said liquid per 100 pbw of sand or other mold material. More important in performance and economy is the amount of binder solids required by our process. the binder solids should be about 0.8 to 1.5 pbw per 100 pbw of sand or its equivalent.

The exposure of the damp sand/binder mixture to microwave heating must be controlled. This exposure is measured in kW-minutes, in other words, the power output in kW times the number of minutes of exposure. Good results are obtained with exposures of 6 to 15 kW-minutes. We prefer 7.5 to 12.5 kW-minutes.

After exposure to the microwave heating, the mold and/or cores may be used immediately to cast the desired pieces or stored for later use. By selection of the right composition, excellent storage properties are obtained. Shakeout and reclaiming the used mold and core material are improved over the prior-art methods.

The binder of our invention is also useful for any other applications wherein the structure to be bonded can be exposed to microwave radiation. Examples of such applications, among others, are coatings for non-metallic surfaces, binders for abrasive wheels and the like, and adhesives for corrugated paperboard.

EXAMPLES

The following examples illustrate certain embodiments of the composition and process of our invention. These examples are not intended to establish the scope of our invention, said scope being fully disclosed in the specification and recited in the claims. All proportions are in parts by weight (pbw) or percent by weight (%) unless otherwise indicated.

EXAMPLE 1

Sand (2000 pbw) was placed in a Hobart mixer, lithium silicate solution (24.0 pbw, 1.6% $Li_2O$ and 18.8% $SiO_2$) was added and mixed for 30 seconds, then sodium silicate solution (30.0 pbw, 13.8% $Na_2O$ and 33.2% $SiO_2$) was added and mixing continued for 90 seconds. Test cores were prepared from this mixture by packing into a standard dog-bone form (manufactured by Harry W. Diertert Co. and having a neck of 1 $in^2$ cross section). The cores were demolded onto a transite board and placed in a 0.6 kW microwave oven. The cores were cured at full power for 15 minutes for an exposure of 9 kW-minutes, cooled at room temperature for 30 min and then tested for tensile strength. The average for 6 specimens was 270 lb/$in^2$. The remaining specimens were exposed to 56% relative humidity (RH), 81% RH and 97% RH for 48 hours; tensile strengths were found to be 271, 291 and 202 lb/$in^2$, respectively. These results indicate that the process of our invention produces cores of acceptable strength that can be stored at high humidity conditions for 48 hours and still be usable.

EXAMPLE 2

The preparation of cores as described in Example 1 was carried out in the same way, except that 42 pbw of sodium silicate was used as the binder. The initial tensile strength was 200 lb/$in^2$, but the cores had no strength after storage at 51% RH for 48 hours. These results illustrate the lack of humidity resistance when only sodium silicate is used as the binder.

Another group of cores were prepared as described and cured in the microwave oven for varying times: 20, 30, 40 and 50 minutes. The tensile strengths after 30 minutes cooling were 200, 188.9, 181.9 and 162.6 lb/$in^2$, respectively. These results illustrate that the strength of the core begins to deteriorate if exposed to excessive amounts of microwave radiation.

EXAMPLE 3

A group of cores prepared as previously described, but with only lithium silicate as used in Example 1, developed no initial strength and could not be tested for tensile strength.

EXAMPLE 4

A group of cores were prepared as described in Example 1 with 5.0 g of $LiOH.H_2O$ dissolved in 100° C. water and 36.0 g of the sodium silicate solution of Example 1. The cores were exposed to 9 kW-minutes of microwave radiation and allowed to cool for 30 minutes before the initial tensile strength of 164 lb/$in^2$ was determined. The remaining cores were exposed to 56% RH, 81% RH and 97% RH for 48 hours. The tensile strengths were 180, 182 and 114 lb/$in^2$ respectively. A second group of cores were prepared using the same binder and method of preparation. The initial tensile strength was 182 lb/$in^2$. The remaining cores were exposed to 97% RH for 1 or 2 weeks. At 1 week the tensile strength was 160 lb/$in^2$ and at 2 weeks, 139 lb/$in^2$. These results show the vast improvement in storage stability that the binder and method of our invention achieves.

We claim:

1. A method of binding particulate materials, comprising the steps of:
   (a) agitating said particulate material;
   (b) adding a solution containing lithium ions, said solution being free of chemical species that gel sodium silicate solutions;
   (c) mixing for a period sufficient to provide a uniform damp mixture;

(d) adding a sodium silicate solution and mixing for a period of time sufficient to provide a uniform mixture;

(e) shaping the uniform damp mixture to the desired shape; and (f) subjecting the uniform damp mixture to microwave radiation;

the amounts of said lithium ions calculated as $Li_2O$ and sodium silicate providing up to 4 moles of $SiO_2$ per mole of $M_2O$ wherein $M_2O=Na_2O+Li_2O$ and 1.25 and 20.0 moles of $Na_2O$ per mole of $Li_2O$.

2. The method of claim 1 wherein the lithium ions source is selected from the group consisting of the lithium polyphosphates, polyborates and mixtures thereof.

3. The method of claim 1 wherein the lithium ions source is lithium silicate or lithium hydroxide and the lithium source and the sodium silicate provide 1.5 to 3.0 moles of $SiO_2$ per mole of $M_2O$ and 1.5 to 10.0 moles of $Na_2O$ per mole of $Li_2O$.

4. The method of either of claims 1 or 3 wherein the mixing in step (c) is for 20 to 60 seconds and the mixing step of step (d) is 60 to 300 seconds.

5. The method of claim 1 wherein the exposure to microwave radiation is 6 to 15 kW-minutes.

6. The method of claim 4 wherein the exposure to microwave radiation is 7.5 to 12.5 kW-minutes.

7. A method of preparing sand foundry molds and cores comprising the steps of:

(a) agitating said sand;

(b) adding a solution containing lithium silicate or lithium hydroxide;

(c) mixing for 20 to 60 seconds to produce a uniform damp mixture;

(d) adding a sodium silicate solution and mixing for 60 to 300 seconds to provide a uniform damp mixture;

(e) forming the damp mixture into a mold or core; and (f) subjecting the uniform damp mixture to 6 to 15 kW-minutes of microwave radiation;

the lithium solution and the sodium silicate solution providing 0.8 to 1.5 parts by weight of solids per 100 parts by weight of sand and up to 4 moles of $SiO_2$ per mole of $M_2O$ wherein $M_2O=Na_2O+Li_2O$, and 1.25 to 20.0 moles of $Na_2O$ per mole of $Li_2O$.

8. The method of claim 7 wherein the lithium solution and sodium silicate solution provide 1.5 to 3.0 moles of $SiO_2$ per mole of $M_2O$ and 1.5 to 10 moles of $Na_2O$ per mole of $Li_2O$.

9. The method of either of claims 7 or 8 wherein the microwave radiation exposure is 6 to 15 kW-minutes.

* * * * *